United States Patent
Doehler et al.

(10) Patent No.: US 10,465,032 B2
(45) Date of Patent: Nov. 5, 2019

(54) RADIATION-CURABLE COATING COMPOUNDS CONSISTING OF A PLURALITY OF COMPONENTS, AND THE USE OF SAME IN RELEASE-COATED SUBSTRATES

(71) Applicants: Hardi Doehler, Essen (DE); Mike Brand, Essen (DE)

(72) Inventors: Hardi Doehler, Essen (DE); Mike Brand, Essen (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 15/535,988

(22) PCT Filed: Dec. 10, 2015

(86) PCT No.: PCT/EP2015/079237
§ 371 (c)(1),
(2) Date: Jun. 14, 2017

(87) PCT Pub. No.: WO2016/096595
PCT Pub. Date: Jun. 23, 2016

(65) Prior Publication Data
US 2017/0369619 A1    Dec. 28, 2017

(30) Foreign Application Priority Data

Dec. 18, 2014  (WO) ............... PCT/EP2014/078393

(51) Int. Cl.
| | |
|---|---|
| C08F 283/12 | (2006.01) |
| C09J 183/12 | (2006.01) |
| C08L 83/12 | (2006.01) |
| C08F 290/06 | (2006.01) |
| C09D 151/08 | (2006.01) |
| C08G 77/20 | (2006.01) |
| C08G 77/442 | (2006.01) |

(52) U.S. Cl.
CPC ........ *C08F 283/128* (2013.01); *C08F 283/12* (2013.01); *C08F 290/068* (2013.01); *C08L 83/12* (2013.01); *C09D 151/085* (2013.01); *C09J 183/12* (2013.01); *C08G 77/20* (2013.01); *C08G 77/442* (2013.01)

(58) Field of Classification Search
CPC ............................... C08F 30/08; C08F 230/08
See application file for complete search history.

(56) References Cited

U.S. PATENT DOCUMENTS

| | | |
|---|---|---|
| 4,976,726 A | 12/1990 | Haverstock |
| 4,978,726 A | 12/1990 | Doehler et al. |
| 5,145,915 A | 9/1992 | Weitemeyer et al. |
| 5,146,005 A | 9/1992 | Weitemeyer et al. |
| 5,171,638 A | 12/1992 | Ozaki et al. |
| 5,260,402 A | 11/1993 | Weitemeyer et al. |
| 5,462,687 A * | 10/1995 | Podszun ............ C08J 3/09 252/572 |
| 5,635,546 A | 6/1997 | Rich et al. |
| 5,853,520 A | 12/1998 | Rich et al. |
| 6,020,445 A * | 2/2000 | Vanderlaan ........... C08F 230/08 526/212 |
| 6,174,712 B1 | 1/2001 | Yokoyama et al. |
| 6,207,782 B1 | 3/2001 | Czech et al. |
| 6,211,322 B1 | 4/2001 | Doehler et al. |
| 6,268,404 B1 | 7/2001 | Doehler et al. |
| 6,548,568 B1 | 4/2003 | Pinto et al. |
| 7,250,204 B2 | 7/2007 | Brand et al. |
| 7,276,541 B2 | 10/2007 | Doehler et al. |
| 7,727,599 B2 | 6/2010 | Doehler et al. |
| 7,893,128 B2 | 2/2011 | Busch et al. |
| 7,923,482 B2 | 4/2011 | Matsuzawa et al. |
| 9,539,549 B2 | 1/2017 | Haensel et al. |
| 2014/0146285 A1 * | 5/2014 | Otani ..................... C08F 2/44 351/159.61 |

FOREIGN PATENT DOCUMENTS

| | | |
|---|---|---|
| CN | 1218816 A | 6/1999 |
| CN | 1237595 A | 12/1999 |
| CN | 1492915 A | 4/2004 |
| CN | 103415802 A | 11/2013 |
| EP | 0 469 613 A2 | 2/1992 |
| EP | 1 276 825 B1 | 9/2004 |
| JP | 2009-26432 A | 2/2009 |
| TW | 460552 B | 10/2001 |
| WO | WO 2012/118678 | * 9/2012 |

OTHER PUBLICATIONS

International Search Report dated Jan. 29, 2016 in PCT/EP2015/079237 filed Dec. 10, 2015.
International Search Report dated Mar. 27, 2015 in PCT/EP2014/078393 filed Dec. 18, 2014.
U.S. Appl. No. 11/013,639, filed Dec. 16, 2004, US 2005-0136269 A1, Hardi Doehler et al.
U.S. Appl. No. 11/780,799, filed Sep. 13, 2007, US 2007-0299231 A1, Hardi Doehler et al.
U.S. Appl. No. 11/851,521, filed Sep. 7, 2007, US 2007-0295243 A1, Hardi Dohler et al.
U.S. Appl. No. 11/530,562, filed Sep. 11, 2006, US 2007-0059539 A1, Hardi Doehler et al.
U.S. Appl. No. 11/677,244, filed Feb. 21, 2007, US 2007-0197678 A1, Pedro Cavaleiro et al.
U.S. Appl. No. 12/024,305, filed Feb. 1, 2008, US 2008-0187702 A1, Michael Ferenz et al.
Combined Taiwanese Office Action and Search Report dated May 10, 2019 in corresponding Taiwanese Patent Application No. 104142109 (with English Translation of Category of Cited Documents), 7 pages.
Combined Office Action and Search Report dated Dec. 13, 2018 in Chinese Patent Application No. 201580069197.7, 9 pages (with English translation of categories of cited documents).

* cited by examiner

*Primary Examiner* — Marc S Zimmer
(74) *Attorney, Agent, or Firm* — Oblon, McClelland, Maier & Neustadt, L.L.P.

(57) ABSTRACT

A composition contains at least one siloxane having ethylenically unsaturated, radically-polymerizable groups, and at least one hydrocarbon having 2 to 6 ethylenically-unsaturated, radically-polymerizable groups, and can be used as a release coating, said composition allowing a good degree of release behavior from adhesive compounds while at the same time also achieving a high level of adhesion of the coating to the carrier material.

10 Claims, No Drawings

RADIATION-CURABLE COATING COMPOUNDS CONSISTING OF A PLURALITY OF COMPONENTS, AND THE USE OF SAME IN RELEASE-COATED SUBSTRATES

Compositions comprising at least one siloxane which has ethylenically unsaturated, radically polymerizable groups, and also comprising at least one hydrocarbon which has 2 to 6 ethylenically unsaturated, radically polymerizable groups, when used as a release coating enable good release characteristics with respect to adhesive materials and at the same time also attain good adhesion of the coating to the carrier material.

Polysiloxanes which comprise (meth)acrylate ester groups are established as binders curable under high-energy radiation, as for example as coating materials for surfaces of plastic and of paper. The curing is accomplished in particular through UV radiation (following addition of known photoinitiators) or by electron beams. (Meth)acrylate-modified organosiloxanes are described in numerous patent specifications, as for example in U.S. Pat. Nos. 6,211,322 and 4,978,726.

(Meth)acrylate-modified organosiloxanes can be crosslinked three-dimensionally be free radicals and cure thermally with addition of peroxides, for example, or under the effect of high-energy radiation, such as UV radiation or electron beams, within a very short time to form coats which possess mechanical and chemical resistance. Where UV light is used as a radiation source, the crosslinking takes place preferably in the presence of photoinitiators and/or photosensitizers, such as benzophenone and its derivatives, benzoin derivatives, alpha-hydroxyalkylphenones and derivatives, and also acylphosphine oxide and derivatives. Customary photoinitiators are described in "A Compilation of Photoinitiators Commercially available for UV today" (K. Dietliker, SITA Technology Ltd., London 2002).

Unbranched polysiloxanes may be modified at the two terminal siloxydimethyl units or at one or more siloxymethyl units within the siloxane chain. Accordingly, the polysiloxanes are referred to as terminally or laterally modified. The modification may also be both terminal and lateral; in the text below, such polysiloxanes are counted among the laterally modified versions.

Abhesive coatings on sheetlike carriers, for use in adhesive tapes or label laminates, for example, are intended to feature, on the one hand, low release forces, with the release force remaining unchanged over time, and on the other hand a high level of adhesion to the carrier material.

Abhesive coatings comprising terminally (meth)acrylate-modified organopolysiloxanes are notable for low release forces when the siloxane chain is sufficiently large. Such polysiloxanes possess a sizeable silicone character, which is not interrupted by organic modifications within the siloxane chain. The adhesion to the carrier material, however, is unsatisfactory.

In order to achieve effective adhesion to the substrate, a higher density of modification with polar and/or reactive groups is required. This is difficult to achieve with exclusively terminally modified siloxanes, since the siloxane chain would have to be shortened accordingly. Such short-chain terminally modified polysiloxanes are comparatively expensive, and so their use would be uneconomic. Moreover, the release force of such siloxanes is increased unsatisfactorily with respect to adhesive materials.

Laterally (meth)acrylate-modified organosiloxanes, in contrast, can be varied in their modification density over wide ranges, irrespective of the molecular weight. Because the steric hindrance of lateral (meth)acrylate groups makes them less reactive, the risk is that not all of the groups will react fully in the polymerization. Leftover acrylate groups of this kind, uncrosslinked, are then able to enter into follow-on reactions, with the pressure-sensitive adhesive of a label laminate, for example, a behavior which would lead to an increase in the release forces over time.

U.S. Pat. No. 5,853,520 discloses an adhesive composition which comprises a silicone/acrylate and an organic acrylate compound. The resin disclosed has a high degree of methacrylic group substitution.

U.S. Pat. No. 6,207,782 discloses compositions hydrophobic acrylate-modified small siloxanes as adjuvant to cosmetics.

EP0469613 discloses very large, hydrophobically substituted, vinyl-functional siloxanes which are not radiation-curable.

U.S. Pat. No. 6,268,404 discloses the combined use of laterally and terminally (meth)acrylate-modified organopolysiloxanes. The aim of such mixtures is to combine the advantages of the individual components while suppressing the disadvantages. Especially on smooth film substrates, however, the mixtures of U.S. Pat. No. 6,268,404 are inadequate in terms of their adhesion, and at the same time have a low release effect.

As well as the (meth)acrylate-modified organopolysiloxanes described, radiation-curing coatings on a purely organic basis are known, and are described in, for example, European Coatings Tech Files; Patrick Glöckner et al. "Radiation Curing Coatings and printing inks", 2008, Vincentz Network, Hannover, Germany.

Such purely organic coating materials exhibit good anchorage to many substrates and can be admixed to (meth)acrylate-modified organopolysiloxanes. It has nevertheless emerged that the low release forces and the long stability of the release effect of the (meth)acrylate-modified organopolysiloxanes are critically impaired by such admixtures.

EP1276825B (U.S. Pat. No. 6,548,568B1) discloses at least binary, preferably at least ternary, mixtures of (meth)acrylate-modified organopolysiloxane as anti-stick compositions, differing in particular through different chain lengths of the polydimethylsiloxane unit. In order to overcome the problem of deficient adhesion of these compositions on polymeric plastics carriers, a possible option is to use an adhesion promoter, which may be any desired polymer comprising acrylate groups or vinyl ether groups, preferably a mixture of dipentaerythritol pentaacrylate and 1,6-hexanediol diacrylate. None of the examples discloses any advantage, for any of the parameters, of admixing the additive.

It was an object of the invention, accordingly, to provide coating materials with the ability to overcome at least one disadvantage of the prior art. The aim is to formulate a coating material which permits very low release forces, i.e. excellent release characteristics, with respect to adhesive materials, while at the same time achieving outstanding adhesion of the coating to the carrier material.

Surprisingly it has been found that compositions comprising at least one siloxane which has ethylenically unsaturated, radically polymerizable groups, and also comprising at least one hydrocarbon which has 2 to 6 ethylenically unsaturated, radically polymerizable groups, as described in the claims, achieve this object.

The present invention accordingly provides compositions comprising components (I), (II) and optionally (III)

(I) 1 to 90 wt %, based on the sum of all components of the composition, of one or more hydrocarbons consisting of the elements carbon, hydrogen and oxygen and having 2 to 6 ethylenically unsaturated, radically polymerizable groups and at least one oxyethylene group.

(II) 10 to 99 wt %, based on the sum of all components of the composition, of one or more organomodified silicones having 50 to 500, preferably 60 to 300, more preferably 70 to 200, especially preferably 80 to 180 silicon atoms, it being possible for 0.4% to 10%, preferably 0.6% to 8%, more preferably 0.8 to 7% of the silicon atoms to carry ethylenically unsaturated, radically polymerizable groups, and it being possible for one silicon atom to carry one, two or three such groups, (III) 0 to 70 wt %, based on the sum of all components of the composition, of one or more organomodified silicones having 4 to 40, preferably 10 to 30, silicon atoms, where 15% to 100%, preferably 20% to 50% of the silicon atoms have ethylenically unsaturated, radically polymerizable groups, with component (I) being preferably free of silicon atoms.

With further preference, the hydrocarbons of components (I), (II) and (III) have groups, as ethylenically unsaturated, radically polymerizable groups, that are selected from acrylic and/or methacrylic ester functions, more preferably acrylic ester functions.

The composition of the invention preferably comprises component (I) at 2 to 50 wt %, more preferably 3 to 30 wt %, based on the sum of all components of the composition.

The hydrocarbon of component (I) preferably has 1 to 25, more 1 to 5, oxyethylene groups per ethylenically unsaturated, radically polymerizable group, more preferably 1 to 25, very preferably 1 to 5, oxyethylene groups per acrylic and/or methacrylic ester function.

With further preference, the hydrocarbon of component (I), as well as the at least one oxyethylene group, also has oxypropylene groups, in which case, more preferably, the number of oxypropylene groups is lower than the number of oxyethylene groups; with particular preference, only a maximum of 20% of the oxyalkyl groups are not oxyethylene groups, based on the total number of oxyalkyl groups in component (I).

More preferably the composition of the invention comprises component (I) at 3 to 30 wt %, based on the sum of all components of the composition, and the hydrocarbon of component (I) has 1 to 5 oxyethylene groups per acrylic and/or methacrylic ester function.

The composition of the invention preferably comprises component (II) at 20 to 98 wt %, 40 to 95 wt %, 40 to 90 wt %, 50 to 85 wt %, and especially preferably 60 to 80 wt %, based on the sum of all components of the composition.

The composition of the invention preferably has component (III) at 5 to 50 wt %, more preferably 10 to 40 wt %, based on the sum of all components of the composition.

Preferred components (II) and/or (II) are those which as well as the ethylenically unsaturated, radically polymerizable groups also comprise groups which are as yet not radically polymerizable. The ester groups which are not radically polymerizable are preferably selected from the acid radicals of the acids acetic acid, propionic acid, butyric acid, valeric acid and benzoic acid, more preferably acetic acid.

More preferably, the groups that are not radically polymerizable are ester groups selected from the acid radicals of the acids acetic acid, propionic acid, butyric acid, valeric acid and benzoic acid, very preferably acetic acid, and the ethylenically unsaturated, radically polymerizable groups are acrylic and/or methacrylic ester functions.

The ester groups that are not radically polymerizable are present in component (III) in a numerical proportion preferably of 3% to 20%, more preferably 5% to 15%, based on the number of all ester functions in component (III).

The ester groups that are not radically polymerizable are present in component (II) in a numerical proportion preferably of 0% to 20%, more preferably of greater than 0% to 15%, and more preferably still not at all.

More preferably, the composition of the invention has no ester groups that are not radically polymerizable in component (II), and in component (III) has a numerical proportion of 5% to 15%, based on the number of all ester functions in component (III), of ester groups which are not radically polymerizable.

More preferably, the composition of the invention comprises component (III) in a percentage of 0 to 70 wt %, having 4 to 40 silicon atoms, with 15% to 100% of the silicon atoms comprising ethylenically unsaturated, radically polymerizable groups, preferably acrylic and/or methacrylic ester functions.

Very preferably the composition of the invention comprises component (III) in a percentage of 0 to 70 wt %, having 4 to 40 silicon atoms, with 15% to 100% of the silicon atoms comprising ethylenically unsaturated, radically polymerizable groups, preferably acrylic and/or methacrylic ester functions, which as well as the ethylenically unsaturated, radically polymerizable groups also comprise ester groups which are as yet not polymerizable, in a numerical fraction of 3% to 20%, based on the number of all ester functions.

The composition of the invention preferably comprises component (III) in a percentage of 10% to 40%, having 10 to 30 silicon atoms, with 20% to 50% of the silicon atoms comprising ethylenically unsaturated, radically polymerizable groups, preferably acrylic ester functions, which as well as the ethylenically unsaturated, radically polymerizable groups also comprise ester groups which are as yet not polymerizable, in a numerical fraction of 5% to 15%, based on the number of all ester functions.

The statement that a particular percentage of the silicon atoms of components (II) and/or (III) are substituted in a particular way pertains to the molar fraction of all silicon atoms in the numerical statistical average of all molecules in the component in question.

An advantage of the compositions of the invention is that they are nevertheless capable of achieving effective adhesion even on very smooth substrates on which physical anchorage, by flow into rough surfaces, is not possible.

With further preference, the components (II) are one or more compounds of the formula (I), $$M^1{}_a M^2{}_b D^1{}_c D^2{}_d \quad (I)$$

where
$M^1 = [R^1{}_3 SiO_{1/2}]$,
$M^2 = [R^1{}_2 R^2 SiO_{1/2}]$,
$D^1 = [R^1{}_2 SiO_{2/2}]$,
$D^2 = [R^1 R^2 SiO_{2/2}]$,
a=0 to 2,
b=0 to 2, and a+b=2,
c=50 to 490, preferably 60 to 290, more preferably 70 to 190, especially preferably 80 to 170,
d=0 to 15, preferably 0 to 10,
and the ratio of the sum (b+d) to the sum (c+d+2) is from 0.004 up to 0.1, preferably 0.006 to 0.8, and more preferably 0.008 to 0.7;
and the sum (c+d+2) is 50 to 500, preferably 60 to 300, more preferably 70 to 200, especially preferably 80 to 180,
$R^1$ denotes identical or different aliphatic hydrocarbons having 1 to 10 carbon atoms or aromatic hydrocarbons having 6 to 12 carbon atoms, preferably methyl and/or phenyl groups, especially preferably methyl groups, $R^2$ denotes identical or different hydrocarbons which have 1 to 5 identical or different ester functions, the hydrocarbon being linear, cyclic, branched and/or aromatic, preferably linear or branched, and the ester functions being selected from ethylenically unsaturated, radically polymerizable ester functions and from ester groups which are not radically polymerizable.

The ethylenically unsaturated, radically polymerizable ester functions of radicals $R^2$ in compounds of the formula (I) are preferably those selected from acrylic and/or methacrylic ester functions, more preferably acrylic ester functions.

The ester groups that are not radically polymerizable of the radicals $R^2$ in compounds of the formula (I) are preferably monocarboxylic acid radicals. The ester groups that are not radically polymerizable are preferably selected from the acid radicals of the acids acetic acid, propionic acid, butyric acid, valeric acid and benzoic acid, more preferably acetic acid. More preferably, the monocarboxylic acid radicals are present in a numerical fraction of 0% to 20%, preferably greater than 0% to 15%, based on the number of all ester functions of the compounds of the formula (II).

The radicals $R^2$ in compounds of the formula (I) preferably have no ester groups which are not radically polymerizable.

With further preference, the components (III) are one or more compounds of the formula (II),

where
$M^1=[R^1{}_3SiO_{1/2}]$,
$M^3=[R^1{}_2R^3SiO_{1/2}]$,
$D^1=[R^1{}_2SiO_{2/2}]$,
$D^3=[R^1R^3SiO_{2/2}]$,
e=0 to 2,
f=0 to 2, preferably zero, and e+f=2,
g=0 to 38, preferably 10 to 26,
h=0 to 20, preferably 4 to 15,
and the ratio of the sum (f+h) to the sum (g+h+2) is from 0.15 up to 1, preferably 0.2 to 0.5,
and the sum (g+h+2) is 4 to 40, preferably 10 to 30,
and the radicals $R^1$ are defined as specified for formula (I),
$R^3$ denotes identical or different hydrocarbons which have 1 to 5 identical or different ester functions, the hydrocarbon being linear, cyclic, branched and/or aromatic, preferably linear or branched, and the ester functions being selected from ethylenically unsaturated, radically polymerizable ester functions and from ester groups which are not radically polymerizable.

The ethylenically unsaturated, radically polymerizable ester functions of radicals $R^3$ in compounds of the formula (II) are preferably those selected from acrylic and/or methacrylic ester functions, more preferably acrylic ester functions.

The ester groups that are not radically polymerizable of the radicals $R^3$ in compounds of the formula (II) are preferably monocarboxylic acid radicals. The ester groups that are not radically polymerizable are preferably selected from the acid radicals of the acids acetic acid, propionic acid, butyric acid, valeric acid and benzoic acid, more preferably acetic acid. More preferably, the monocarboxylic acid radicals are present in a numerical fraction of 3% to 20%, preferably 5% to 15%, based on the number of all ester functions of the compounds of the formula (II).

With particular preference, the composition of the invention necessarily comprises component (III).

Additionally provided by the present invention is the use of the compositions of the invention as radiation-curing coating materials.

The use of the compositions in radiation-curing coating materials is preferably a release coating. A release coating is more preferably an abhesive coating.

The present invention further provides radiation-curing coating materials comprising the compositions of the invention and optionally further additives.

The additives are preferably selected from photoinitiators, photosensitizers, fillers, pigments, solvents, phosphorus-containing compounds which polymerize under UV light, stabilizers, e.g. phosphites or hindered amine light stabilizers (HALS), anti-misting additives and amine synergists.

The radiation-curing coating materials of the invention can be crosslinked three-dimensionally by free radicals. Under the influence of high-energy radiation, such as UV radiation or electron beams, they cure fully within a very short time to form coats with mechanical and chemical resistance which, given appropriate composition of the coating materials of the invention, have predeterminable abhesive properties and also adhesion properties.

Where UV light is used as a radiation source, the cross-linking/curing takes place preferably in the presence of photoinitiators and/or photosensitizers.

Preferred photoinitiators are those of Norrish type 1, e.g. benzoin derivatives, alpha-hydroxyalkylphenones and derivatives, and acylphosphine oxide and derivatives.

Preferred radiation-curing coating materials of the invention comprise photoinitiators and/or photosensitizers in amounts of 0.01 to 10 wt %, more particularly of 0.1 to 5 wt %, based on the overall coating material.

The photoinitiators and/or photosensitizers are preferably soluble in the compositions of the invention, more preferably soluble in the range from 0.01 to 10 wt %, more particularly from 0.1 to 5 wt %, based on the overall coating material.

Suitable UV radiation sources for curing the coating materials of the invention are medium-pressure mercury vapor lamps, optionally doped, or low-pressure mercury vapor lamps, UV-LED lamps, or excimer emitters. The UV sources may be polychromatic or monochromatic. The emission range of the emitter is preferably situated in the absorption range of the photoinitiators and/or photosensitizers.

The coating materials of the invention exhibit very good adhesion and a very good release effect at the same time.

Release coatings are known in the prior art—preferably abhesive coatings on sheetlike carriers—for use in adhesive tapes or label laminates.

The adhesion of the cured coating to the carrier material is verified by vigorous rubbing with the thumb on the coating. If adhesion is inadequate, rubber-like crumbs are formed. Such crumbs ought not to be produced even on intense rubbing. This test is referred to generally as the "rub-off" test and corresponds to a mixture of coating scratch resistance (cohesion) and substrate adhesion by the coating (adhesion). The test is conducted by a trained panel.

The release effect with respect to adhesive materials, in industrial application usually adhesive tapes or labels, is expressed by the release force, with a low release force describing a good release effect. The release force is dependent on the quality of the release coating, on the adhesive and on the test conditions. For evaluation of release coatings, therefore, identical adhesives and test conditions ought to be present. For the determination of the release forces, adhesive tapes or label laminates are cut to a width of 2.5 cm and the adhesive side is applied to the silicone coating under test. This test is carried out in accordance with FINAT Handbook, 8th Edition, The Hague/NL, 2009 under designation FTM 10, with the modification that the storage is carried out at 40° C. under pressure. In order to verify the stability of the release force, the procedure is repeated with a prolonged storage time of three months.

The present invention is described by way of example in the examples set out below, without any possibility that the invention, the scope of application of which is apparent from the entirety of the description and the claims, can be read as being confined to the embodiments stated in the examples.

EXAMPLES: COMPONENTS

Component I:
  Not inventive:
    NE-I-1: Trimethylolpropane triacrylate, SR 351, Sartomer, France
    NE-I-2: Pentaerythritol triacrylate, Miramer M340, Rahn AG, Germany
    NE-I-3: Hexanediol diacrylate, Miramer M200, Rahn AG, Germany
    NE-I-4: Tripropylene glycol diacrylate, Miramer M220, Rahn AG, Germany
  Inventive:
    E-I-1: Ethoxylated (according to product description, 3 ethylene oxide units in total) trimethylolpropane triacrylate, Miramer 3130, Rahn AG, Germany
    E-I-2: Ethoxylated (according to product description, 20 ethylene oxide units in total) trimethylolpropane triacrylate, SR 415, Sartomer, France
    E-I-3: Polyethylene glycol 600 diacrylate (according to product description, Mw 700 g/mol; corresponds to glycol with 12 ethylene oxide units), Ebecryl® 11, Allnex, Ebecryl is a trade mark of Cytec Surface Specialties S.A. Anderlecht, Belgium
    E-I-4: Ethoxylated and propoxylated (according to $^1$H-NMR 1.2 propylene oxide and 5 ethylene oxide units in total) pentaerythritol tetraacrylate, Ebecryl® 40, Allnex, Ebecryl is a trade mark of Cytec Surface Specialties S.A. Anderlecht, Belgium
Component II:
    E-II-1: An exclusively terminally modified silicone with N=50, where N is the number of silicon atoms in the molecule. Prepared by process described in U.S. Pat. No. 6,211,322 via a corresponding hydrogensiloxane by hydrosilylation with trimethylolpropane monoallyl ether and subsequent esterification with acrylic acid, to give 4 acrylate groups per molecule; correspondingly, 4% of the silicon atoms are acrylated.
    E-II-2: An exclusively terminally modified silicone with N=100. Prepared as E-II-1; correspondingly, 2% of the silicon atoms are acrylated.
    E-I-3: An exclusively terminally modified silicone with N=200. Prepared as E-II-1; correspondingly 1% of the silicon atoms are acrylated.
    E-II-4: An exclusively terminally modified silicone with N=300. Prepared as E-II-1; correspondingly 0.67% of the silicon atoms are acrylated.
    E-II-5: An exclusively terminally modified silicone with N=100. Prepared by process described in U.S. Pat. No. 6,211,322 via a corresponding hydrogensiloxane by hydrosilylation with 5-hexen-1-ol and subsequent esterification with acrylic acid, to give 2 acrylate groups per molecule; correspondingly, 2% of the silicon atoms are acrylated.
    S-II-1: An exclusively laterally modified silicone with N=100. Prepared by process described in U.S. Pat. No. 4,978,726 via a hydrogensiloxane with 6 pendant SiH groups, by hydrosilylation with allyl glycidyl ether and subsequent ring opening with acrylic acid, to give 6 acrylate groups per molecule; correspondingly, 6% of the silicon atoms are acrylated.
    S-II-2: A terminally and laterally modified silicone with N=150. Prepared by process described in U.S. Pat. No. 6,211,322 via a hydrogensiloxane having 6 pendant and 2 terminal SiH groups, by hydrosilylation with 5-hexen-1ol and subsequent esterification with acrylic acid, to give 8 acrylate groups per molecule; correspondingly, 5.3% of the silicon atoms are acrylated.
Component III:
    S-III-1: An exclusively laterally modified silicone with N=40. Prepared by process described in U.S. Pat. No. 4,978,726 via a hydrogensiloxane with 6 pendant SiH groups, by hydrosilylation with allyl glycidyl ether and subsequent ring opening with acrylic acid, to give 6 acrylate groups per molecule; correspondingly, 15% of the silicon atoms are acrylated.
    S-III-2: An exclusively laterally modified silicone with N=10. Prepared by process described in U.S. Pat. No. 4,978,726 via a hydrogensiloxane with 5 pendant SiH groups, by hydrosilylation with allyl glycidyl ether and subsequent ring opening with acrylic acid, to give 5 acrylate groups per molecule; correspondingly, 50% of the silicon atoms are acrylated.
    S-III-3: An exclusively laterally modified silicone with N=20. Prepared by process described in U.S. Pat. No. 4,978,726 via a hydrogensiloxane with 6 pendant SiH groups, by hydrosilylation with allyl glycidyl ether and subsequent ring opening with a mixture of 15% acetic acid and 85% acrylic acid, to give 5.1 acrylate groups per molecule; correspondingly, 25.5% of the silicon atoms are acrylated.

Examples: Compositions

TABLE 1

Inventive compositions, content figures in wt % based on the sum total of the recited components

| Example | Component I | Content [wt %] | Component II | Content [wt %] | Component III | Content [wt %] |
|---|---|---|---|---|---|---|
| E-A | E-I-1 | 10 | E-II-2 | 70 | S-III-3 | 20 |
| E-B | E-I-2 | 10 | E-II-2 | 70 | S-III-3 | 20 |
| E-C | E-I-3 | 10 | E-II-2 | 70 | S-III-3 | 20 |
| E-D | E-I-4 | 10 | E-II-2 | 70 | S-III-3 | 20 |
| E-E | E-I-1 | 10 | E-II-1 | 70 | S-III-3 | 20 |
| E-F | E-I-1 | 10 | E-II-3 | 70 | S-III-3 | 20 |
| E-G | E-I-1 | 10 | E-II-4 | 70 | S-III-3 | 20 |
| E-H | E-I-1 | 10 | E-II-5 | 70 | S-III-3 | 20 |
| E-I | E-I-1 | 10 | S-II-1 | 70 | S-III-3 | 20 |
| E-J | E-I-1 | 10 | S-II-2 | 70 | S-III-3 | 20 |
| E-K | E-I-1 | 10 | E-II-2 | 70 | S-III-1 | 20 |
| E-L | E-I-1 | 10 | E-II-2 | 70 | S-III-2 | 20 |
| E-M | E-I-1 | 5 | E-II-2 | 95 | — | — |
| E-N | E-I-1 | 30 | E-II-2 | 70 | — | — |
| E-O | E-I-1 | 80 | E-II-2 | 20 | — | — |
| E-P | E-I-1 | 2 | E-II-2 | 60 | S-III-3 | 38 |

TABLE 2

Non-inventive compositions, content figures in wt % based on the sum total of the recited components

| Example | Component I | Content [wt %] | Component II | Content [wt %] | Component III | Content [wt %] |
|---|---|---|---|---|---|---|
| N-A | NE-I-1 | 10 | E-II-2 | 70 | S-III-3 | 20 |
| N-B | NE-I-2 | 10 | E-II-2 | 70 | S-III-3 | 20 |
| N-C | NE-I-3 | 10 | E-II-2 | 70 | S-III-3 | 20 |
| N-D | NE-I-4 | 10 | E-II-2 | 70 | S-III-3 | 20 |
| N-E | NE-I-1 | 10 | E-II-1 | 70 | S-III-3 | 20 |
| N-F | NE-I-1 | 10 | E-II-3 | 70 | S-III-3 | 20 |
| N-G | NE-I-1 | 10 | E-II-4 | 70 | S-III-3 | 20 |
| N-H | NE-I-1 | 10 | E-II-5 | 70 | S-III-3 | 20 |
| N-I | NE-I-1 | 10 | S-II-1 | 70 | S-III-3 | 20 |
| N-J | NE-I-1 | 10 | S-II-2 | 70 | S-III-3 | 20 |
| N-K | NE-I-1 | 10 | E-II-2 | 70 | S-III-1 | 20 |
| N-L | NE-I-1 | 10 | E-II-2 | 70 | S-III-2 | 20 |
| N-M | NE-I-1 | 5 | E-II-2 | 95 | — | — |
| N-N | NE-I-1 | 30 | E-II-2 | 70 | — | — |
| N-O | NE-I-1 | 80 | E-II-2 | 20 | — | — |
| N-P | NE-I-1 | 2 | E-II-2 | 60 | S-III-3 | 38 |
| N-Q | — | — | E-II-1 | 70 | S-III-3 | 30 |
| N-R | — | — | E-II-2 | 70 | S-III-3 | 30 |
| N-S | — | — | E-II-3 | 70 | S-III-3 | 30 |
| N-T | — | — | E-II-4 | 70 | S-III-3 | 30 |
| N-U | — | — | E-II-5 | 70 | S-III-3 | 30 |
| N-V | — | — | S-II-1 | 70 | S-III-3 | 30 |
| N-W | — | — | S-II-2 | 70 | S-III-3 | 30 |
| N-X | — | — | E-II-2 | 70 | S-III-1 | 30 |
| N-Y | — | — | E-II-2 | 70 | S-III-2 | 30 |
| N-Z1 | NE-I-1 | 30 | | | S-III-3 | 70 |
| N-Z2 | E-I-2 | 30 | | | S-III-3 | 70 |

Examples: Performance Testing

To produce radiation-curing coating materials, 100 g of each of the compositions of Table 1 and Table 2 were combined with 2% of photoinitiator TEGO® A18 from Evonik Industries AG. The coating materials were stirred manually with a spatula until there was no longer any visible inhomogeneity. The coating materials were applied to a sheetlike carrier. In all of the examples, this carrier was a BOPP (oriented polypropylene) film 50 cm wide, subjected to corona pretreatment beforehand with a generator power of 1 kW. The coating materials were applied using a 5-roll coating unit from COATEMA® Coating Machinery GmbH, Dormagen, Germany with a weight per unit area of about 1 g/m² and were cured by exposure to UV light from a medium-pressure mercury vapor lamp from IST® Metz GmbH, Nürtingen Germany at 60 W/cm and at a web speed of 100 m/min under a nitrogen atmosphere with a residual oxygen content of less than 50 ppm.

The coated samples were subjected to testing for rub-off, release force and release-force stability (change in release forces over time).

Rub-off: The adhesion of the cured coating to the carrier material is tested by vigorous rubbing with the thumb on the coating. In the event of deficient adhesion, rubberlike crumbs are formed. Even if intense, rubbing should not produce such crumbs. The test is carried out by a trained panel. The evaluation is categorized in school grades from 1 to 3, with 3 corresponding to inadequate.

Rating 1=very good scratch resistance and anchorage to the substrate. With linear and subsequent circular movement at the same location, no crumbs can be ascertained.

Rating 2=sufficient scratch resistance and substrate adhesion. With linear movement, no crumbs are produced, but with a subsequent circular movement at the same location, crumbs are formed.

Rating 3=insufficient scratch resistance and adhesion. Crumbs are produced even on linear movement.

Release forces: The release forces are tested according to the protocol from FINAT Handbook 8th Edition, The Hague/NL, 2009 under the designation FTM 10, with the modification that storage is under pressure at 40° C. Materials used were the adhesive tape of trade mark TESA®7476 from tesa SE, Germany, Hamburg, and also a label laminate slit to a width of 2.5 cm and coated with the hotmelt adhesive Technomelt PS 9129A from Henkel Corporation/USA on a white paper print substrate. For the test, the laminate is parted and Technomelt PS 9129A on print carrier paper is used as test adhesive.

The results of the rub-off tests, the release forces and the release-force stabilities are set out in Tables 3a (inventive examples) and 3b (non-inventive examples): Rub-off (ratings 1 to 3); release forces (TW) with two adhesives in cN/2.5 cm after 24 hours of storage at 40° C., release-force stability for adhesive PS 9129A in cN/2.5 cm after 3 months of 40° C. storage.

TABLE 3a

Results of example 3, inventive coating materials according to example 1.

| Example | Rub-off | TW (PS 9129A) 24 h [cN/2.5 cm] | TW (PS 9129A) 3 months [cN/2.5 cm] | TW (TESA 7476) 24 h [cN/2.5 cm] |
|---|---|---|---|---|
| E-A | 1 | 11 | 14 | 36 |
| E-B | 1 | 10 | 11 | 34 |
| E-C | 1 | 10 | 12 | 35 |
| E-D | 1 | 11 | 13 | 36 |
| E-E | 1 | 23 | 25 | 71 |
| E-F | 1 | 7 | 8 | 29 |
| E-G | 2 | 4 | 4 | 30 |
| E-H | 1 | 4 | 6 | 31 |
| E-I | 1 | 17 | 19 | 49 |
| E-J | 1 | 16 | 16 | 40 |
| E-K | 1 | 10 | 11 | 32 |
| E-L | 1 | 13 | 13 | 41 |
| E-M | 1 | 8 | 9 | 34 |
| E-N | 1 | 12 | 15 | 42 |
| E-O | 1 | 16 | 23 | 48 |
| E-P | 1 | 10 | 11 | 36 |

The release forces of inventive examples E-A, E-E to E-L (Table 3a) are comparable to the non-inventive, comparative examples N-Q to N-Y (Table 3b). On comparison of the rub-off values, the disadvantage of the absence of component I is evident in the non-inventive examples N-Q to N-Y; the values for the inventive examples E-A, E-E to E-L show an improved, lower rub-off.

It is possible likewise to compare non-inventive example N-R with inventive examples E-A to E-D. The release forces are comparable; the rub-off of the inventive compositions is improved. In the non-inventive examples N-A to N-D as well, the rub-off is improved relative to the figure for N-R, but the release forces are increased. Particularly noteworthy here is the particularly degraded release-force stability of the non-inventive examples N-A to N-D relative to the inventive examples E-A to E-D.

Even a small fraction of inventive component I may already bring about an improvement in the rub-off, as shown by example E-P. Again, in comparison to the non-inventive components, a better release force is observed; example N-P.

It is also apparent from Tables 3a and 3b that mixtures without component III are also able to achieve good rub-off. Inventive examples E-M to E-O achieve a lower release force again than the non-inventive mixtures N-M to N-O.

TABLE 3b

Results of example 3, non-inventive coating materials according to example 1.

| Example | Rub-off | TW (PS 9129A) 24 h [cN/2.5 cm] | TW (PS 9129A) 3 months [cN/2.5 cm] | TW (TESA 7476) 24 h [cN/2.5 cm] |
|---|---|---|---|---|
| N-A | 1 | 16 | 28 | 51 |
| N-B | 1 | 17 | 29 | 48 |
| N-C | 1 | 18 | 32 | 46 |
| N-D | 1 | 18 | 35 | 46 |
| N-E | 1 | 31 | 48 | 86 |
| N-F | 1 | 15 | 29 | 42 |
| N-G | 2 | 12 | 26 | 38 |
| N-H | 1 | 11 | 23 | 40 |
| N-I | 1 | 25 | 38 | 55 |
| N-J | 1 | 21 | 36 | 48 |
| N-K | 1 | 15 | 28 | 41 |
| N-L | 1 | 17 | 35 | 52 |
| N-M | 1 | 14 | 27 | 43 |
| N-N | 1 | 19 | 39 | 56 |
| N-O | 1 | 29 | 56 | 76 |
| N-P | 1 | 15 | 31 | 46 |
| N-Q | 2 | 22 | 26 | 72 |
| N-R | 2 | 10 | 13 | 35 |
| N-S | 3 | 6 | 8 | 30 |
| N-T | 3 | 4 | 5 | 28 |
| N-U | 3 | 6 | 6 | 33 |
| N-V | 2 | 18 | 20 | 48 |
| N-W | 3 | 15 | 16 | 38 |
| N-X | 3 | 9 | 11 | 33 |
| N-Y | 2 | 12 | 13 | 40 |
| N-Z1 | 1 | 159 | 296 | 563 |
| N-Z2 | 1 | 162 | 312 | 620 |

From table 3b it is apparent that non-inventive compositions consisting only of components II and III, corresponding to examples N-Q to N-Y, do not exhibit very good substrate adhesion as expressed via rub-off (all values above 1). Some of the comparative examples achieve sufficient adhesion, especially those mixtures with a relativeliy high release force. The adhesion of mixtures with particularly low release forces (N-S to N-U and also N-X) is insufficient.

This shows that with mixtures consisting only of components II and III, it is not possible to obtain a coating combining good adhesion with low release force.

It is apparent, moreover, that using only component I and component III, as in examples N-Z1 and N-Z2, does not give coatings with low release forces. It is irrelevant in this case whether component III is mixed with inventive component I or non-inventive component I. Mixtures without component II are therefore not purposive and not inventive. Component II must, instead, be added in order for the required low release forces to be achieved.

It is apparent, moreover, that by adding non-inventive components I (N-A to N-P) it is possible to improve the rub-off, but the release force is increased. In this regard, a comparison ought to be made between the figures for N-A and N-E to N-L and the figures for N-Q to N-Y.

By using the compositions of the invention, accordingly, success is achieved in simultaneously obtaining good rub-off, low release force and good release-force stability.

The invention claimed is:

1. A composition, comprising:
   (I) 1 to 90 wt %, based on the sum of all components of the composition, of one or more compounds consisting of the elements carbon, hydrogen and oxygen and having 2 to 6 ethylenically unsaturated, radically polymerizable groups and at least one oxyethylene group,
   (II) 10 to 99 wt %, based on the sum of all components of the composition, of one or more organo-modified silicones of formula (I), $$M^1{}_a M^2{}_b D^1{}_c D^2{}_d \qquad (I)$$

wherein
   $M^1 = [R^1{}_3 SiO_{1/2}]$,
   $M^2 = [R^1{}_2 R^2 SiO_{1/2}]$,
   $D^1 = [R^1{}_2 SiO_{2/2}]$,
   $D^2 = [R^1 R^2 SiO_{2/2}]$,
   a=0 to 2,
   b=0 to 2, and a+b=2,
   c=50 to 490,
   d=0 to 15,
   the ratio of the sum (b+d) to the sum (c+d+2) is from 0.004 up to 0.1;
   the sum (c+d+2) is from 50 to 500,
   $R^1$ denotes identical or different aliphatic hydrocarbons having 1 to 10 carbon atoms or aromatic hydrocarbons having 6 to 12 carbon atoms, and
   $R^2$ denotes identical or different hydrocarbons which have 1 to 5 identical or different ester functions, the hydrocarbon being linear, cyclic, branched and/or aromatic, and the ester functions being selected from ethylenically unsaturated, radically polymerizable ester functions and from ester groups which are not radically polymerizable;
   (III) 0 to 70 wt %, based on the sum of all components of the composition, of one or more organomodified silicones having 4 to 40 silicon atoms, where 15% to 100% of the silicon atoms have ethylenically unsaturated, radically polymerizable groups.

2. The composition as claimed in claim 1, wherein the component (II) has, as ethylenically unsaturated, radically polymerizable groups, acrylic and/or methacrylic ester functions.

3. The composition as claimed in claim 1, wherein the component (III) is present and the component III further comprises ester groups which are not radically polymerizable.

4. The composition as claimed in claim 2, wherein the components (II) have no ester groups which are not radically polymerizable.

5. The composition as claimed in claim 1, wherein the component (III) is present and the component (III) comprises a compound of formula (II)

$$M^1{}_e M^3{}_f D^1{}_g D^3{}_h \qquad (II)$$

wherein
$M^1 = [R^1{}_3 SiO_{1/2}]$,
$M^3 = [R^1{}_2 R^3 SiO_{1/2}]$,
$D^1 = [R^1{}_2 SiO_{2/2}]$,
$D^3 = [R^1 R^3 SiO_{2/2}]$,
e=0 to 2,
f=0 to 2, and e+f=2,
g=0 to 38,
h=0 to 20,
and the ratio of the sum (f+h) to the sum (g+h+2) is from 0.15 up to 1,
and the sum (g+h+2) is 4 to 40,
$R^1$ denotes identical or different aliphatic hydrocarbons having 1 to 10 carbon atoms or aromatic hydrocarbons having 6 to 12 carbon atoms,
$R^3$ denotes identical or different hydrocarbons which have 1 to 5 identical or different ester functions, the hydrocarbon being linear, cyclic, branched and/or aromatic, and the ester functions being selected from ethylenically unsaturated, radically polymerizable ester functions and from ester groups which are not radically polymerizable.

6. The composition as claimed in claim 1, wherein component (III) is present.

7. A radiation-curing coating material, comprising:
the composition as claimed in claim 1.

8. The radiation-curing coating material as claimed in claim 7, which is a release coating material.

9. The radiation-curing coating material as claimed in claim 7, further comprising an additive.

10. The radiation-curing coating materials as claimed in claim 9, wherein the additive is at least one selected from the group consisting of photoinitiators, photosensitizers, fillers, pigments, solvents, phosphorus-containing compounds which polymerize under UV light, stabilizers, anti-misting additives and amine synergists.

* * * * *

UNITED STATES PATENT AND TRADEMARK OFFICE
CERTIFICATE OF CORRECTION

PATENT NO. : 10,465,032 B2  
APPLICATION NO. : 15/535988  
DATED : November 5, 2019  
INVENTOR(S) : Hardi Doehler et al.

Page 1 of 1

It is certified that error appears in the above-identified patent and that said Letters Patent is hereby corrected as shown below:

In the Claims

In Column 7, Line 22, delete "France" and insert -- France. --, therefor.

In Column 7, Line 24, delete "Germany" and insert -- Germany. --, therefor.

In Column 7, Line 26, delete "Germany" and insert -- Germany. --, therefor.

In Column 7, Line 28, delete "Germany" and insert -- Germany. --, therefor.

In Column 7, Line 32, delete "Germany" and insert -- Germany. --, therefor.

In Column 7, Line 35, delete "France" and insert -- France. --, therefor.

In Column 7, Line 40, delete "Belgium" and insert -- Belgium. --, therefor.

In Column 7, Line 45, delete "Belgium" and insert -- Belgium. --, therefor.

In Column 7, Line 58, delete "E-I-3" and insert -- E-II-3 --, therefor.

In Column 11, Line 37, delete "relativeliy" and insert -- relatively --, therefor.

Signed and Sealed this
Twenty-fourth Day of March, 2020

Andrei Iancu
*Director of the United States Patent and Trademark Office*